United States Patent [19]
Messelhi

[11] Patent Number: 5,387,763
[45] Date of Patent: Feb. 7, 1995

[54] ENCLOSURE FOR STRAIGHT CABLE SPLICE

[75] Inventor: Selim Messelhi, Etobicoke, Canada

[73] Assignee: Communications Technology Corporation, Dallas, Tex.

[21] Appl. No.: 61,927

[22] Filed: May 13, 1993

[51] Int. Cl.6 .................................... H02G 15/113
[52] U.S. Cl. ............................. 174/92; 174/76
[58] Field of Search .................. 174/92, 91, 93, 76, 174/138 F

[56] References Cited

U.S. PATENT DOCUMENTS

| | | | |
|---|---|---|---|
| D. 313,396 | 1/1991 | Messelhi | D13/154 |
| 964,969 | 7/1910 | Hesterhagen . | |
| 3,147,338 | 9/1964 | Ekvall et al. . | |
| 3,325,591 | 6/1967 | Wahl . | |
| 3,757,031 | 9/1973 | Izraeli | 174/92 |
| 3,823,254 | 7/1974 | Smith | 174/92 |
| 3,897,128 | 7/1975 | Reavis, Jr. | 439/406 |
| 3,934,076 | 1/1976 | Smith | 174/87 |
| 3,992,569 | 11/1976 | Hankins et al. | 174/92 |
| 4,029,384 | 6/1977 | Reinwall, Jr. | 439/397 |
| 4,029,626 | 6/1977 | Gillemot et al. | 524/773 |
| 4,029,896 | 6/1977 | Skinner | 174/138 F |
| 4,035,051 | 7/1977 | Guy | 174/138 F |
| 4,053,709 | 10/1977 | Smith | 174/87 |
| 4,070,543 | 1/1978 | Thompson et al. | 174/87 |
| 4,084,066 | 4/1978 | Gillemot | 174/92 |
| 4,084,067 | 4/1978 | Gillemot | 174/92 |
| 4,128,739 | 12/1978 | Bernstein | 179/1 PC |
| 4,141,618 | 2/1979 | Reavis, Jr. et al. | 439/406 |
| 4,176,245 | 11/1979 | Merlack et al. | 174/92 |
| 4,218,724 | 8/1980 | Kaufman | 361/395 |
| 4,253,720 | 3/1981 | Crosier | 439/362 |
| 4,285,563 | 8/1981 | Crosier et al. | 439/153 |
| 4,337,374 | 6/1982 | Smith | 174/138 F |
| 4,355,130 | 10/1982 | Heinze | 524/491 |
| 4,375,521 | 3/1983 | Arnold | 523/173 |
| 4,423,916 | 1/1984 | Muehlhausen, II | 439/590 |
| 4,427,248 | 1/1984 | Smith | 65/1 |
| 4,435,612 | 3/1984 | Smith | 174/92 |
| 4,610,738 | 9/1986 | Jervis | 174/92 |
| 4,649,230 | 3/1987 | Nielsen | 175/65 R |
| 4,751,350 | 6/1988 | Eaton | 174/87 |
| 4,752,653 | 6/1988 | Bachel et al. | 174/93 |
| 4,775,122 | 10/1988 | McClymont | 174/65 R |
| 4,932,744 | 6/1990 | Messelhi | 350/96.2 |
| 4,933,512 | 6/1990 | Nimiya et al. | 174/92 |
| 4,963,700 | 10/1990 | Olsen et al. | 174/138 F |
| 5,001,300 | 3/1991 | Messelhi | 174/87 |
| 5,099,088 | 3/1992 | Usami et al. | 174/76 |
| 5,240,432 | 8/1993 | Daoud | 439/417 |

FOREIGN PATENT DOCUMENTS

1157137 11/1983 Canada .
2201306 8/1988 United Kingdom .

Primary Examiner—Morris H. Nimmo
Attorney, Agent, or Firm—Crutsinger & Booth

[57] ABSTRACT

An environmentally sealed enclosure for encapsulating an in-line splice between cable segments. Cable gripping apparatus in the housing limits movement of the cable relative to the housing to prevent separation of sealant from a cable when a cable is positioned to extend through the entrance into the housing. Walls of top and bottom shell segments are configured to be locked together for forming an enclosure containing encapsulant for protecting the splice.

13 Claims, 5 Drawing Sheets

ENCLOSURE FOR STRAIGHT CABLE SPLICE

TECHNICAL FIELD

The invention relates to an enclosure for encapsulation of buried in-line telecommunication service wire splices.

BACKGROUND OF INVENTION

Telecommunication cables are interconnected by joining or splicing individual conductors of two or more cables or service wires for forming a telecommunications network. A pre-filled, two-piece closure for from two to twenty-five pair butt spliced cable or cable and dropwire configurations are commercially available from Communications Technology Corporation of Dallas, Tex. under its registered trademark "KLIK-IT". These closures are designed for the encapsulation and direct burial of butt spliced cable. Such closures are well known to persons skilled in the art and are disclosed in U.S. Pat. No. 4,337,374 to Donald J. Smith, entitled "Service Wire Splice Enclosure" and U.S. Pat. No. 5,001,300 to Selim Messelhi, entitled "Encapsulated Cable Splice Closure."

U.S. Pat. No. 4,435,612 to Donald J. Smith, entitled "Cable Splice Housing," discloses a cable splice housing formed of two shells for handling two or more cables in end-to-end or side-by-side arrangements. One of the shells has an opening for pouring a sealing material into the central section after the shells are brought together, and a cover for closing the opening. The shells have interengaging wedge-shaped bosses and corresponding openings for locking the shells together.

A housing for an electrical cable splice for handling two or more cables in end-to-end or side-by-side arrangements is commercially available from Communications Technology Corporation of Dallas, Tex. under its registered trademark "PEE WEE" for permanent encapsulation of buried splices. The closure is distributed as a kit containing inner and outer clear plastic sleeves; two end caps with snip-off wire access fingers; a finger-tension bonding connector; and a package containing encapsulation compound which is poured into the closure after a dropwire splice has been made. The closures are commercially available in two sizes, one for service wire up to $\frac{1}{4}"$ outside diameter and another for service wire up to $\frac{3}{8}"$ outside diameter.

Other enclosures for wire splices are disclosed in U.S. Pat. Nos. 3,934,076; 4,053,704; 4,084,066; 4,084,067; 4,337,374; 4,176,245; 3,147,338; 3,325,591; and 4,029,896.

SUMMARY OF INVENTION

The enclosure for a straight cable splice disclosed herein relates to improvements in devices of the type disclosed in U.S. Pat. Nos. 4,337,374; 4,435,612 and 5,001,300.

The enclosure for a splice between first and second cables having a layer of insulation includes a housing formed of housing segments having an entrance and sealant in the housing segments. Cable gripping apparatus in the housing limits movement of the cable relative to the housing to prevent separation of the sealant from a cable when a cable is positioned to extend through the entrance into the housing.

The cable gripping apparatus includes a thin, substantially flat, and generally U-shaped member having an elongated opening bounded by edges which engage and grip the layer of insulation on the cable to relieve stress in a splice in said housing when cable segments are in tension.

One of the housing segments forming the enclosure has spaced first and second cable engaging projections that urge the cable into engagement with the gripping apparatus.

BRIEF DESCRIPTION OF THE DRAWINGS

Drawings of a preferred embodiment of the invention are annexed hereto, so that the invention may be better and more fully understood, in which.

Numeral references are employed to designate like parts throughout the various figures of the drawing.

DESCRIPTION OF A PREFERRED EMBODIMENT

Figure 1:
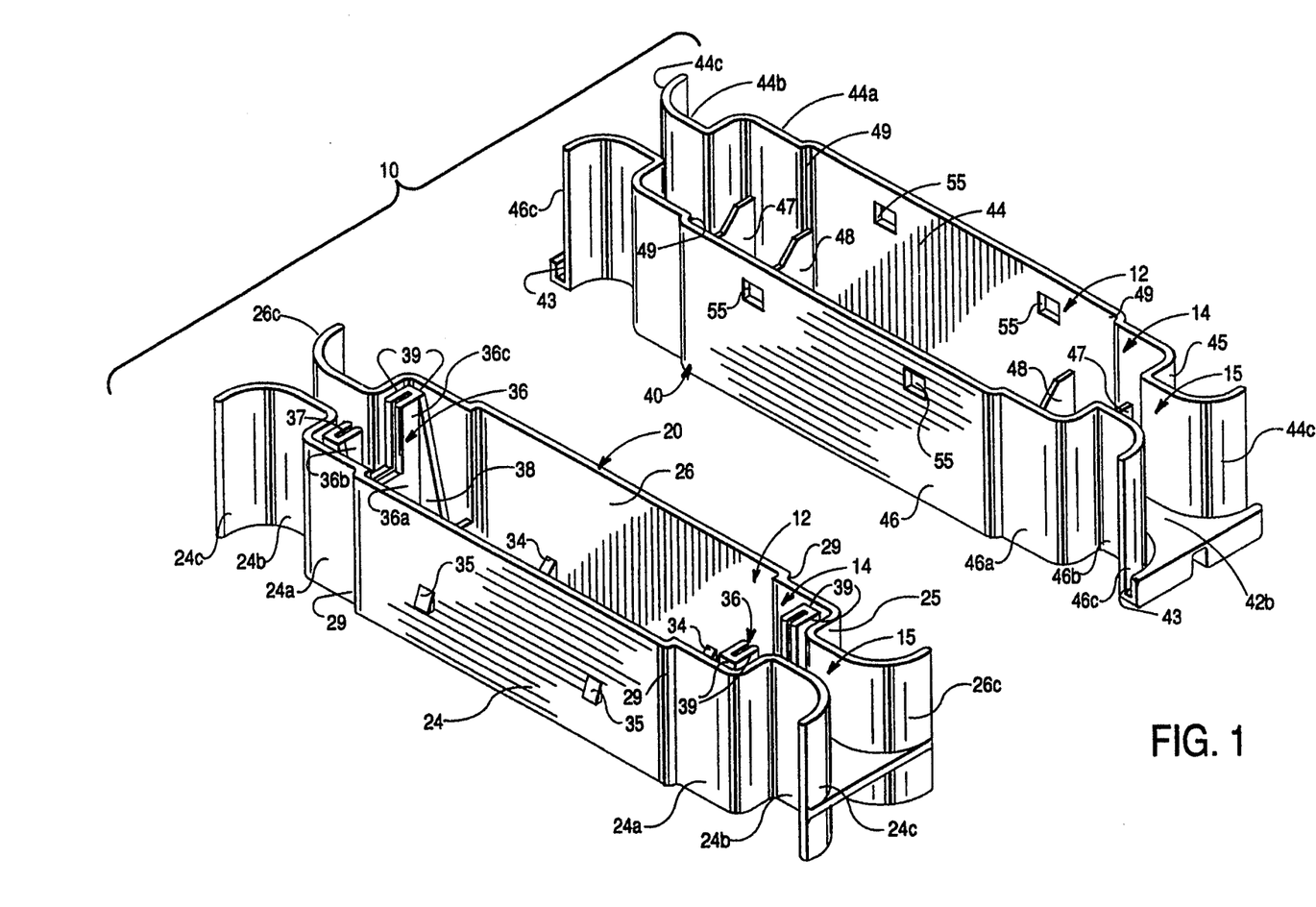
FIG. 1 is an exploded perspective view of an enclosure.
Figure 2:
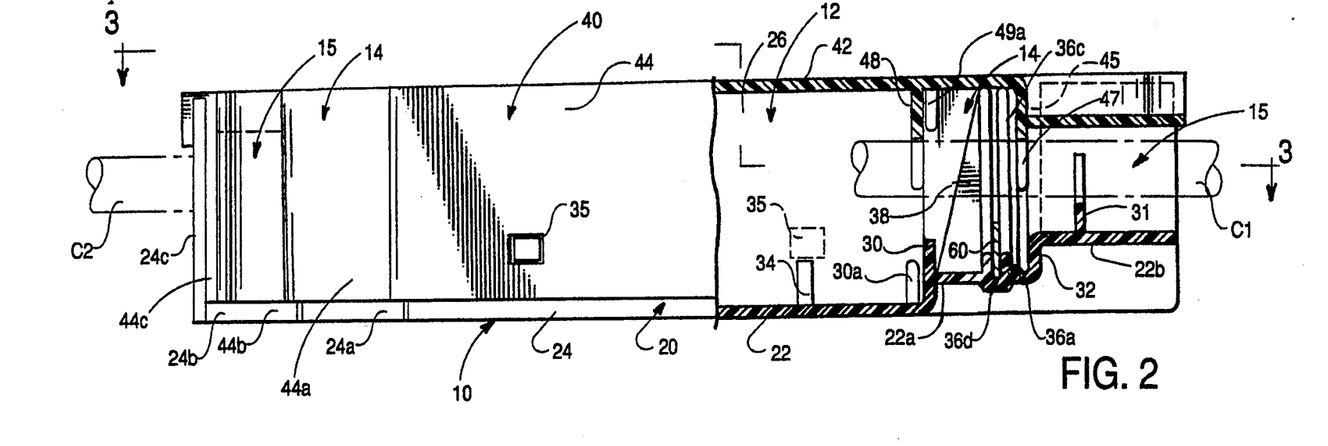
FIG. 2 is a side elevational view thereof, parts being broken away to more clearly illustrate details of construction.
Figure 3:
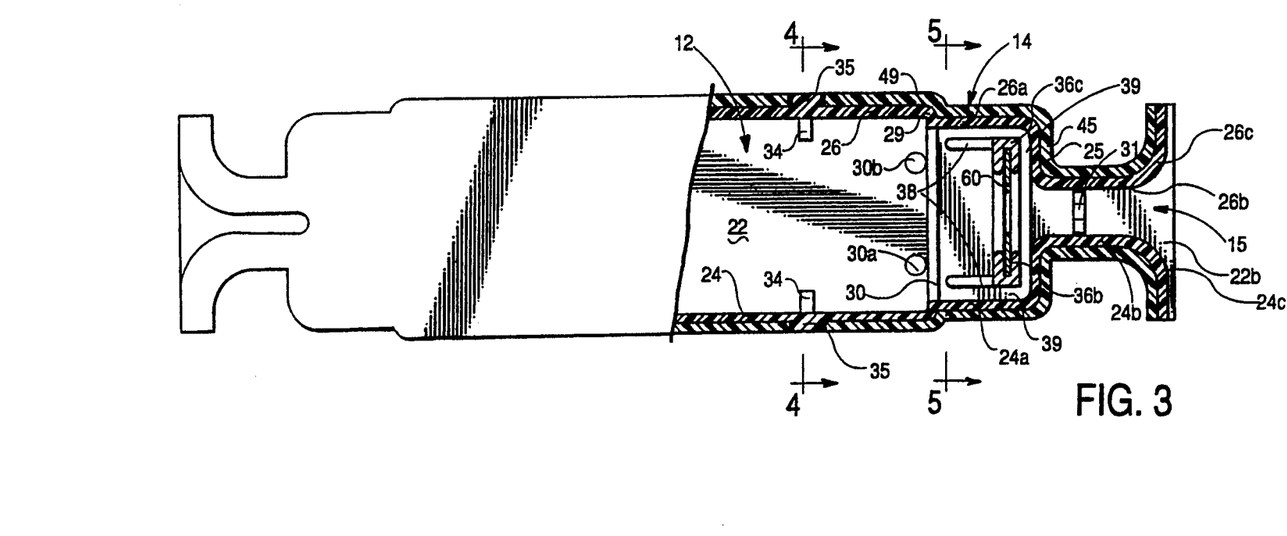
FIG. 3 is a cross-sectional view taken substantially along line 3—3 of FIG. 2.
Figure 10:
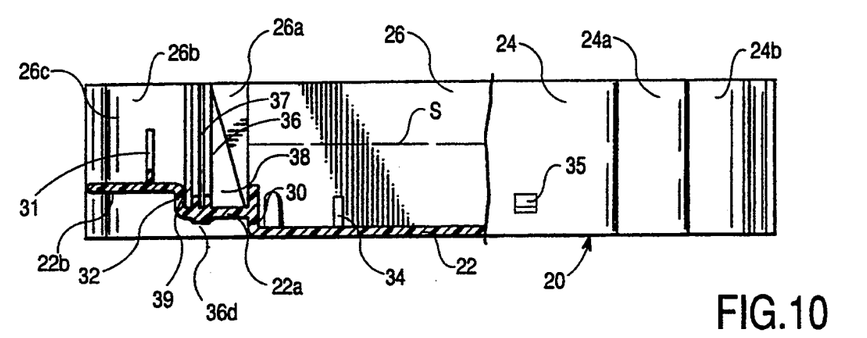
FIG. 10 is a cross-sectional view taken along line 10—10 of FIG. 9.
Figure 13:
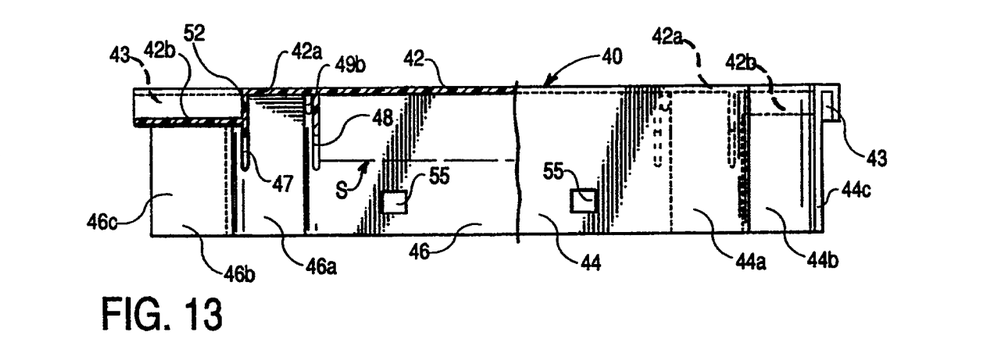
FIG. 13 is a cross-sectional view taken along line 13—13 of FIG. 12.

Referring to FIGS. 1-3, the numeral 10 generally designates a sealant filled, two-part enclosure for a wire splice formed by a female bottom shell segment 20 and a male top shell segment 40, each of the shell segments being configured to form a central housing section 12 between spaced throat sections 14 and spaced entrance sections 15. The central housing section 12 of each shell segment 20 and 40 is partially filled with a suitable gel or sealant S, as illustrated in FIGS. 10 and 13, for encapsulating a splice between conductors in ends of cables C1 and C2 positioned end-to-end, cable extending through each entrance section 15 of the enclosure 10. Cables C1 and C2 may contain conductors, for example, for from four to twelve pairs of telecommunication lines.

The bottom shell segment 20 is configured to grip ends of cables C1 and C2 while the craftsman splices or joins ends of conductors in the cable.

Figure 9:
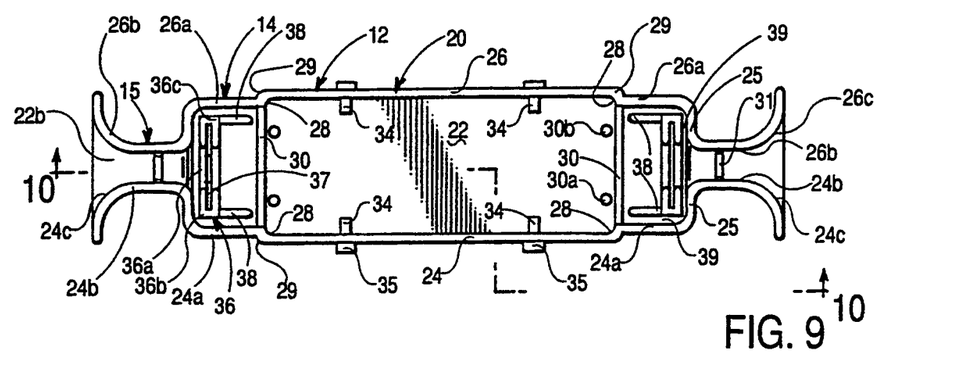
FIG. 9 is a top plan view of the bottom shell segment.
Figure 11:
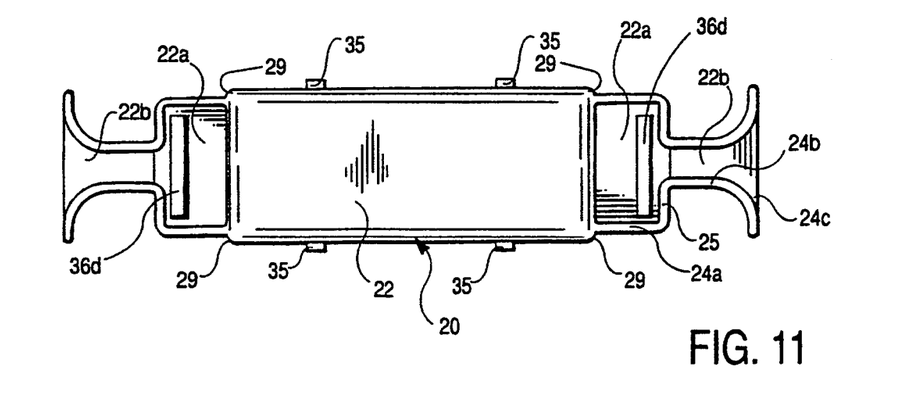
FIG. 11 is a bottom plan view of the bottom shell segment.
Figure 12:
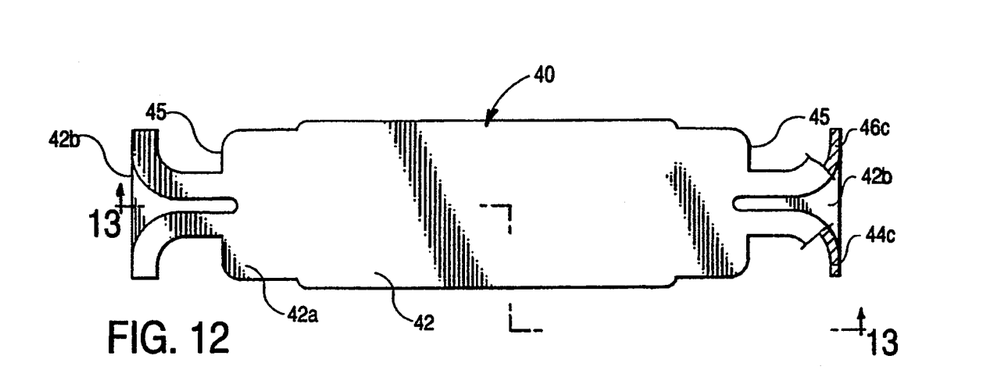
FIG. 12 is a top plan view of the top shell segment.
Figure 14:
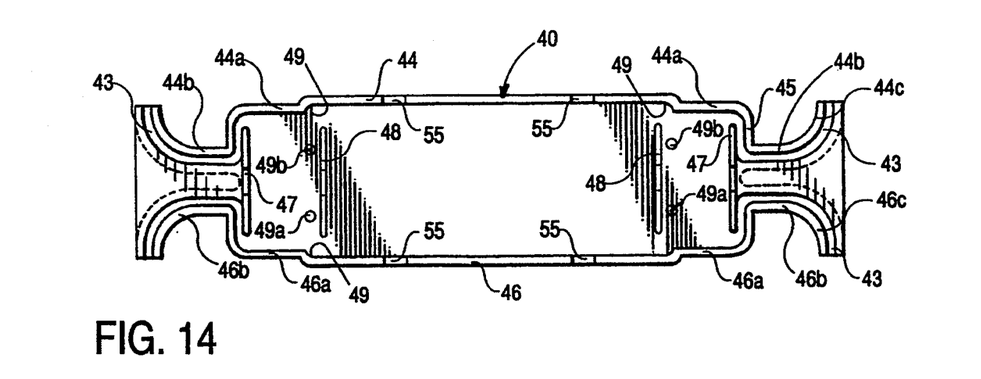
FIG. 14 is a bottom plan view of the bottom shell segment.

Details of construction of the bottom shell segment 20 are illustrated in FIGS. 9, 10 and 11 while details of construction of the top shell segment 40 are illustrated in FIGS. 12, 13 and 14 of the drawing.

Figure 4:
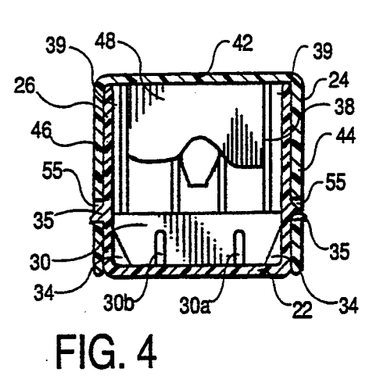
FIG. 4 is a cross-sectional view taken along line 4—4 of FIG. 3.

As best illustrated in FIGS. 9-11 of the drawing, the central housing section 12 of the bottom shell segment 20 is formed by a bottom wall segment 22 extending between upwardly extending front wall segment 24 and rear wall segment 26. The throat section 14 of bottom shell segment 20 is formed by a bottom wall segment 22a bounded on two edges by a front wall segment 24a and a rear wall segment 26a. Each entrance section 15 has a bottom wall segment 22b, front wall segment 24b and rear wall segment 26b. As best illustrated in FIGS. 1, 4 and 9, the front and rear wall segments 24b and 26b have curved outer extremities 24c and 26c that guide a cable into the entrance section 15.

As best illustrated in FIG. 10 of the drawing, the bottom wall segment 22b of entrance section 15 is formed on an elevation above that of the bottom wall segment 22a of throat section 14 which is formed at an elevation above the elevation of bottom wall segment 22 of the central housing section 12.

As illustrated in FIG. 9 of the drawing, front wall segments 24, 24a and 24b are offset laterally as are rear wall segments 26, 26a and 26b such that the cross-sectional area of bottom shell segment 20 is stepped progressively from the central housing section 12 toward opposite ends of enclosure 10. Sockets 28 and shoulders 29 are formed at the intersections of the wall segments 24 and 24a and at the intersection of wall segments 26 and 26a. End wall segments 25 extend inwardly from outer ends of front wall segments 24a and rear wall segments 26a and connect with rear edges of wall segments 24b and 26b.

A short partition wall segment 30 extends upwardly from opposite ends of bottom wall segment 22 for supporting bottom wall segment 22a of each throat section 14. Posts 30a and 30b, best illustrated in FIG. 4, extend upwardly from bottom wall segment 22 adjacent partition wall segment 30 for retaining a blocking sheet of material (not shown) to close throat section 14 while sealant is being deposited in the central housing section of bottom shell segment 20. The blocking sheet is removed after the shell segment is partially filled with sealant.

A wall segment 32 extends upwardly from an end of each bottom wall segment 22a for supporting bottom wall segment 22b in the entrance section 15 at opposite ends of enclosure 10. A generally U-shaped support bracket 31 is secured to bottom wall segment 22b and to front and rear wall segments 24b and 26b in the entrance section 15 for centering a cable C1 or C2 in entrance section 15 and for stabilizing the cable to prevent movement of the cable in the throat section 14 of the housing. Movement of the cable in the throat section 14 could form a gap in the sealant through which moisture would migrate.

As best illustrated in FIGS. 9 and 10, stiffener ribs 34 extend upwardly from bottom wall section 22 in housing section 12 and are secured to lower portions of front wall segment 24 and rear wall segment 26. Locking tabs 35 extend outwardly from outer surfaces of front wall segment 24 and rear wall segment 26 for securing bottom shell segment 20 in top shell segment 40, as will be hereinafter more fully explained.

As best illustrated in FIGS. 1, 2, 3 and 5, each throat section 14 of bottom shell segment 20 is provided with a boss 36 having a lower portion 36a formed in bottom wall segment 22a, a rib 36d on the outside of bottom wall segment 22a, and upwardly extending leg portions 36b and 36c spaced inwardly from front wall segment 24a and rear wall segment 26a. The boss 36 has a groove 37 formed for supporting a strain relief clip 60, as will be hereinafter more fully explained.

Triangular shaped gussets 38 are formed adjacent opposite ends of boss 36 and extend upwardly from bottom wall segment 22a to upper ends of legs 36b and 36c of boss 36. As best illustrated in FIG. 9 of the drawing, gussets 38 are spaced inwardly from front wall segment 24a and rear wall segment 26a leaving space 39 therebetween.

Boss 36 is spaced inwardly from wall 32 leaving space 39 between boss 36 and wall 32. Leg portions 36b and 36c of boss 36 are spaced inwardly from end wall segment 25 leaving space 39 between end wall segment 25 and boss 36.

When a cable C1 is positioned as illustrated in FIG. 2 of the drawing, movement of shell segment 40 downwardly over shell segment 20 urges sealant into sealing relation with outer surfaces of cable C1 in throat section 14 of the housing. Sealant flows through space 39, illustrated in FIG. 5, between gussets 38 and legs 36b and 36c of boss 36 to fill the outer portion of throat section 14 and the inner end of entrance section 15. Thus, sealant is forced into sealing relation with the surface of cable C1 adjacent opposite sides of strain release clip 60 which scores and grippingly engages the outer surface of cable C1.

Details of construction of top shell segment 40 are best illustrated in FIGS. 12–14 of the drawing.

Referring to FIGS. 2, 3 and 12-14, the central housing section 12 of top shell segment 40 has a top wall segment 42 bounded by a front wall segment 44 and a back wall segment 46. Each throat section 14 of top shell segment 40 has a top wall segment 42a, a front wall segment 44a and a rear wall segment 46a. Each entrance section 15 of top shell segment 40 has a top wall segment 42b, a front wall segment 44b and a rear wall segment 46b. As best illustrated in FIG. 14, the front and rear wall segments 44b and 46b have curved outer extremities 44c and 46c that guide a cable into the entrance section 15 and upper edges of wall segments 44b, 44c, 46b and 46c are folded over to form a channel 43 for capturing the upper edges of wall segments 24b, 24c, 26b and 26c on bottom shell segment 20.

As best illustrated in FIG. 13 of the drawing, top wall segments 42 and 42a lie in a common plane while top wall segments 42b in the entrance section 15 of top shell segment 40 is formed at an elevation below that of top wall segments 42 and 42a and is supported by an end wall segment 45 extending downwardly from top wall segments 42a.

A pair of generally V-shaped projections 47 and 48 extend downwardly from top wall segments 42 and 42a, as illustrated in FIGS. 1, 4, 5, 6, 13 and 14, for centering the cable in the enclosure and for engaging the cable adjacent opposite sides of strain relief clip 60 for inserting and securing the cable in the clip 60. The generally V-shaped projections 47 stabilize the cable to prevent movement of the cable in the throat section 14 of the housing. Movement of the cable in the throat section 14 could form a gap in the sealant through which moisture would migrate.

Posts 49a and 49b extend downwardly from top wall segment 42 adjacent projection 48 for retaining a blocking sheet of material (not shown) to close throat section 14 while sealant is being deposited in the central housing section of top shell segment 40. The blocking sheet is removed after the shell segment is partially filled with sealant.

As best illustrated in FIG. 13 of the drawing, recesses 55 are formed in front wall segment 44 and back wall segment 46.

Figure 6:
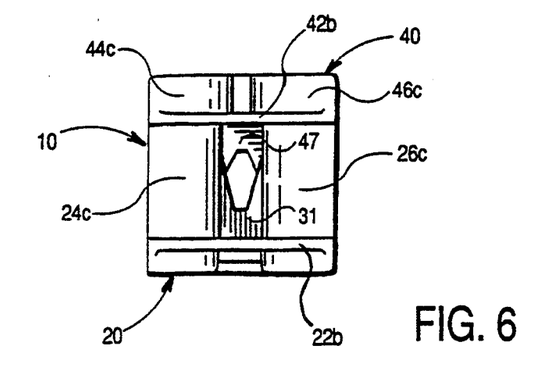
FIG. 6 is an end view of the enclosure.

As best illustrated in FIGS. 2 and 3 of the drawing, when the male bottom shell segment 20 is positioned inside the female top shell segment 40, front and rear walls 24 and 26 of bottom shell segment 20 are positioned adjacent inner surfaces of front wall segment 44 and rear wall segment 46 of top shell segment 40. As illustrated in FIG. 6, front and rear wall sections 24a and 26a of bottom shell segment 20 are positioned between front wall sections 44a and rear wall sections 46b of top shell segment 40. In the entrance section 15 of enclosure 10, front wall segment 24b and rear wall segment 26b of bottom shell segment 20 are positioned between front wall segment 44b and rear wall segment 46b of top shell segment 40, as illustrated in FIG. 3.

Referring to FIG. 1, shoulders 29 on the outer surface of wall segments 44 and 44a extend into sockets 49 in the inner surface at the intersection of wall segments 44 and 44a. Shoulders 29 assist in aligning locking tabs 35 on outer surfaces of front wall segment 24 and rear wall segment 26 of bottom shell segment 20 with openings 55 formed in front wall segment 44 and rear wall segment 46 of top shell segment 40 for locking the shell segments 20 and 40 together.

End wall segments 25, between throat section 14 and entrance section 15 of bottom shell segment 20, extend upwardly between end wall segment 45 and V-shaped projection 47 on top shell segment 40 such that the upper edges of front wall segments 25 are captured between the end wall segments 45 and projections 47 on top shell segment 40.

Figure 7:
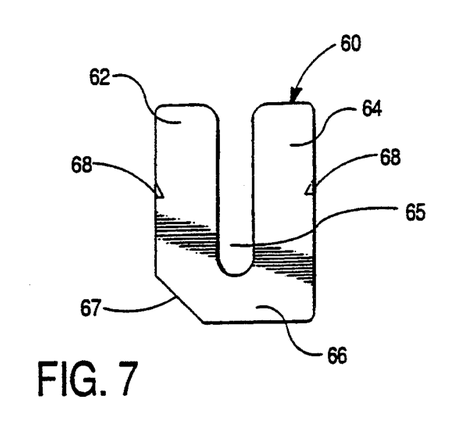
FIG. 7 is a front elevational view of a strain relief clip.
Figure 8:
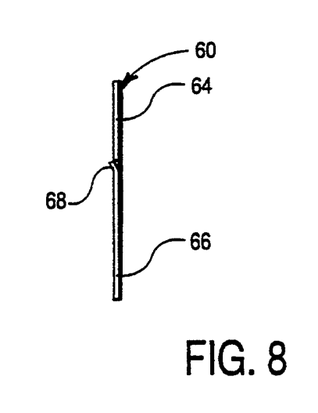
FIG. 8 is a side elevational view of the strain relief clip.

As best illustrated in FIGS. 7 and 8 of the drawing, the stress relief clip 60 is a thin substantially flat generally U-shaped member formed by legs 62 and 64 separated by a slot 65 and joined at lower ends by a connector portion 66. As best illustrated in FIG. 7, one corner of connector portion 66 is removed to provide a tapered surface 67 to facilitate positioning strain relief clip 60 in groove 37, best illustrated in FIG. 1, formed in boss 36 on bottom shell segment 20.

Outwardly deflected barbs 68 are formed adjacent outer edges of each leg 62 and 64 of strain relief clip 60. Deflected barbs 68 are formed by cutting the outer edge of each leg 62 and 64, for example at an angle of 30° relative to the outer edge of each leg 62 and 64 and deflecting a portion of each leg 62 and 64 outwardly from the plane of the body of clip 60 for forming a sharp barb 68 on each leg 62 and 64.

When cable C1 or C2 is positioned in slot 65, edges of legs 62 and 64 score and grip the insulating sheath on the cable. However, slot 65 is sized to prevent cutting through the insulating sheath and the electrical conductors housed therein.

As best illustrated in FIGS. 2 and 3 of the drawing, curved front and rear wall sections 24c and 26c guide cable C1 through entrance section 15 and throat section 14 into the central section 15 of enclosure 10. Support bracket 31 in the entrance section 14 of bottom shell segment 20 centers cable 31 in the housing. Projections 47 and 48 on top shell segment 40 urge cable C1 downwardly through slot 65 in stress relief clip 60 such that edges of legs 62 and 64 of clip 60 indent or store the insulated cover on cable C1 to prevent movement of cable C1 longitudinally of the housing sections. Further, surfaces on projections 47 and 48 as well as surfaces on support bracket 31 urge spaced segments of cable C1 toward the center of the housing sections.

Figure 5:
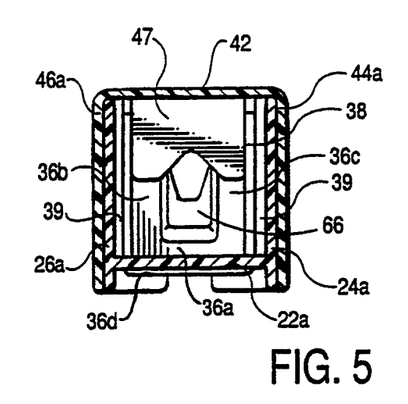
FIG. 5 is a cross-sectional view taken along line 5—5 of FIG. 3.

As the top shell segment 40 is moved downwardly over bottom shell segment 20 toward the position illustrated in FIGS. 2 and 3 of the drawing, sealant in the central section 12 flows to fill throat section 14. Referring to FIGS. 1,3 and 5, sealant in the throat section 14 flows through the curved space 39 between gussets 38 and legs 36b and 36c of boss 36 such that sealant flows toward cable C1 adjacent end wall segment 25 into the entrance section 15 of the housing.

When shell segments 20 and 40 are properly positioned, latching tabs 35 snap into openings 55 for locking the shell segments together preventing movement of one shell segment relative to the other.

Upper edges of walls of the bottom shell segment 20 extend into the top shell segment 40 and space between the wall segments of the shell segments are sealed by sealant forced out of the central section 12 of the housing. Upper edges of front and rear wall segments int the entrance section 15 are captured in the channel 43 at the upper end of front and rear walls of the top shell segment 40. Thus, front and rear wall segments are securely locked together. The stepped cross-sectional area of the housing in the central section 12, throat section 14 and entrance section 15 facilitate attachment of the shell segments together to form a strong rigid construction and facilitate the flow of sealant to block ingress of moisture into the housing. Thus, conductors in cable C1 and C2 can be spliced to form electrical connections which are protected by sealant from the environment. Stress relief clips 60 stabilize cables C1 and C2 to prevent the cables being pulled out of the housing and to prevent damage to spliced conductors in the housing.

After housing segments 20 and 44 have been locked together as illustrated in FIGS. 2 and 3 of the drawing, enclosure 10 can be dropped in a trench and buried.

I claim:

1. An enclosure for a splice between first and second cables having a layer of insulation including a housing formed of first and second housing segments having an entrance; sealant in said housing segments; and cable gripping apparatus in said housing, said gripping apparatus comprising: strain relief means in said first housing segment; and spaced projections in said second housing segment for urging a cable into engagement with said strain relief means to score and grip the layer of insulation for limiting movement of the cable relative to the housing to prevent separation of said sealant from a cable when a cable is positioned to extend through said entrance into said housing.

2. An enclosure for a splice between first and second cables according to claim 1, said cable gripping apparatus comprising: a member having an opening bounded by edges which engage and grip the layer of insulation on the cable.

3. An enclosure for a splice between first and second cables according to claim 1, said stress relief means comprising: a thin substantially flat generally U-shaped member formed by legs separated by a slot, said legs being joined at lower ends by a connector portion.

4. An enclosure for a splice between first and second cables according to claim 1, said first housing segment having a latch to prevent movement of said first housing segment relative to said first cable.

5. An enclosure for a splice between first and second cables having a layer of insulation comprising: a housing formed of housing segments having an entrance; sealant in said housing segments; a thin fiat generally U-shaped cable gripping member formed by legs having barbs separated by a slot, said legs being joined at lower ends by a connector portion in said housing, said gripping member limiting movement of the cable relative to the housing to prevent separation of said sealant from a cable when a cable is positioned to extend through said entrance into said housing.

6. An enclosure for a splice between first and second cables having a layer of insulation comprising: a housing formed of housing segments having an entrance one of said housing segments having spaced first and second cable engaging projections; sealant in said housing segments; cable gripping apparatus in said housing, said gripping apparatus limiting movement of the cable relative to the housing to prevent separation of said sealant from a cable when a cable is positioned to extend through said entrance into said housing, said cable gripping apparatus being positionable between said first and second cable engaging projections such that said cable engaging projections urge the cable into engagement with said gripping apparatus.

7. An enclosure for a splice between first and second cables having a layer of insulation comprising: a housing formed of first and second housing segments having an entrance; sealant in said housing segments; and cable gripping apparatus in said housing, said gripping apparatus limiting movement of the cable relative to the housing to prevent separation of said sealant from a cable when a cable is positioned to extend through said entrance into said housing, said second housing segment having a boss, said boss having a groove formed to support said cable gripping apparatus.

8. An enclosure for a splice between first and second cables according to claim 7, said boss comprising: a lower portion secured to said second housing segment and upwardly extending leg portions spaced inwardly from front and rear walls of said second housing segment, said boss having a groove formed for supporting said cable gripping apparatus.

9. An enclosure for a splice between first and second cables according to claim 7, each of said housing segments having an entrance section adjacent said entrance, said entrance section having curved front and rear wall segments configured to guide a cable into said housing.

10. An enclosure for a splice between first and second cables having a layer of insulation comprising: a housing formed of housing segments having an entrance, said housing segments having walls; a strain relief clip; a boss in said housing having a groove formed for supporting said strain relief clip; and sealant in said housing segments, said strain relief clip limiting movement of the cable relative to the housing to prevent separation of said sealant from a cable when a cable is positioned to extend through said entrance into said housing.

11. An enclosure for a splice between first and second cables according to claim 10, each of said housing segments having an entrance section adjacent said entrance, said entrance section having curved front and rear wall segments configured to guide a cable into said housing.

12. An enclosure for a splice between first and second cables according to claim 10, one of said housing segments having spaced first and second cable engaging projections, said strain relief clip being positioned between said first and second cable engaging projections such that said cable engaging projections urge the cable into engagement with said strain relief clip.

13. An enclosure for a splice between first and second cables according to claim 10, one of said housing segments having a latch to prevent movement of said housing segments relative to the cable.

* * * * *

UNITED STATES PATENT AND TRADEMARK OFFICE
CERTIFICATE OF CORRECTION

PATENT NO. : 5,387,763

DATED : February 7, 1995

INVENTOR(S) : Selim Messelhi

It is certified that error appears in the above-identified patent and that said Letters Patent is hereby corrected as shown below:

Column 2, line 55, after "end-to-end," insert -- one --.

Column 4, line 24, change "release" to read -- relief --.

Column 5, line 36, change "stress" to read -- strain --.

Column 5, line 64, change "stress" to read -- strain --.

Column 6, line 20, change "int" to read -- in --.

Column 6, line 32, change "Stress" to read -- Strain --.

Column 6, line 59, change "stress" to read -- strain --.

Signed and Sealed this

Twentieth Day of June, 1995

*Attest:*

BRUCE LEHMAN

*Attesting Officer*     *Commissioner of Patents and Trademarks*